United States Patent

Shimomura et al.

[11] Patent Number: 5,163,755
[45] Date of Patent: Nov. 17, 1992

[54] TEMPERATURE REGULATOR

[75] Inventors: Tooru Shimomura, Muko; Kazutomo Naganawa, Suita; Toshiya Tanamura, Takatsuki, all of Japan

[73] Assignee: Omrom Tateisi Electronics Co., Kyoto, Japan

[21] Appl. No.: 687,787

[22] Filed: Apr. 22, 1991

Related U.S. Application Data

[63] Continuation of Ser. No. 391,390, Aug. 9, 1989, abandoned, which is a continuation of Ser. No. 175,400, Mar. 30, 1988, abandoned.

[30] Foreign Application Priority Data

Mar. 31, 1987 [JP] Japan ............................. 62-49108[U]

[51] Int. Cl.⁵ .............................................. G01K 7/12
[52] U.S. Cl. ................................... 374/181; 374/179; 374/182; 136/222
[58] Field of Search ............... 374/181, 179, 208, 182, 374/180, 163; 136/230, 222

[56] References Cited

U.S. PATENT DOCUMENTS

| | | | |
|---|---|---|---|
| 3,529,473 | 1/1969 | Hager | 374/181 |
| 3,690,177 | 9/1972 | Fluegel | 374/182 |
| 3,893,340 | 7/1975 | Parker | 374/161 |
| 4,120,201 | 10/1978 | Wargo | 374/181 |
| 4,131,756 | 12/1978 | Smith | 374/181 |
| 4,133,700 | 1/1979 | Hollander et al. | 374/181 |
| 4,157,663 | 6/1979 | Ihlenfeldt et al. | 374/181 |
| 4,221,923 | 9/1980 | Nagao et al. | 374/182 |
| 4,403,296 | 9/1983 | Prosky | 374/181 |
| 4,404,813 | 9/1983 | Paddock et al. | 374/208 |
| 4,423,968 | 1/1984 | Nemcek, Sr. et al. | 374/181 |
| 4,453,552 | 6/1984 | Ensign | 374/181 |
| 4,575,806 | 3/1986 | Aldrich et al. | 374/172 |
| 4,603,228 | 7/1986 | Kamada | 374/182 |
| 4,623,266 | 11/1986 | Kielb | 374/181 |
| 4,673,300 | 6/1987 | Wilhelmson et al. | 374/181 |
| 4,776,706 | 10/1988 | Loiterman et al. | 374/181 |

FOREIGN PATENT DOCUMENTS

| | | |
|---|---|---|
| 0115214 | 8/1984 | European Pat. Off. |
| 2610468 | 9/1976 | Fed. Rep. of Germany |
| 2082774 | 3/1982 | United Kingdom ............ 374/181 |

OTHER PUBLICATIONS

"Thermocouple Cold Junction Compensator 'Omega-CJ,'" Omega Engineering, Product Bulletin 803-A (Sep. 1968).

Hageman, S., "Compensator Cancels Cold-Junction Errors," Electronic Design, vol. 30, No. 4, p. 203 (Feb. 1982).

Primary Examiner—William A. Cuchlinski, Jr.
Assistant Examiner—Diego F. F. Gutierrez
Attorney, Agent, or Firm—Dickstein, Shapiro & Morin

[57] ABSTRACT

A temperature regulator is provided which includes a temperature sensor, a temperature regulating unit, a cold junction temperature measuring device and a double-wall insulating partition. Temperatures measured by the temperature sensor are compensated with the temperatures measured by the cold junction temperature measuring device. Since the double-wall insulating partition insulates the cold junction measuring device from the heat generated inside the temperature regulating unit, the cold junction measuring device can correctly measure the temperature of the cold junction.

11 Claims, 4 Drawing Sheets

TEMPERATURE REGULATOR

This application is a continuation of application Ser. No. 07/391,390 filed Aug. 9, 1989 now abandoned, which is a continuation of 07/175,400 filed Mar. 30, 1988 now abandoned.

BACKGROUND OF THE INVENTION

1. Field of the Invention

This invention relates to a temperature regulator, and more particularly, to a temperature regulator which employs a cold junction temperature measuring device.

2. Discussion of the Related Art

A type of temperature regulator, which employs connecting pins inserted into a socket to which a thermocouple is connected, is widely used. In such a temperature regulator, the temperature of a cold junction to which the thermocouple is connected, is measured to compensate temperatures sensed by the thermocouple. A cold junction temperature measuring device is used to measure the temperature of the cold junction. In such conventional temperature regulators, the temperature compensating device is incorporated in a boss of a connecting pin.

However, since the boss is not thermally coupled to the cold junction, the temperature measuring device cannot correctly measure the temperature of the junction. Also, since the measuring device is not thermally insulated from the heat generated inside the regulator, the operation point of the regulator often fluctuates. Furthermore, the regulator requires a long time to begin to operate stably after its power supply is turned on.

SUMMARY OF THE INVENTION

It is, therefore, an object of this invention to provide a temperature regulator which allows the temperature measuring device to correctly measure the temperature of the cold junction.

It is another object of this invention to provide a temperature regulator in which the temperature measuring device is thermally insulated from the heat generated inside the regulator.

It is still another object of this invention to provide a temperature regulator which begins to operate stably in a short time after its power supply is turned on.

According to this invention, there is provided a temperature regulator including a socket to which a temperature sensor is connected via a cold junction, and a temperature regulating unit which is connected to the socket. The temperature regulating unit includes (1) a cold junction temperature measuring means for measuring temperatures of the cold junction, (2) a first thermal insulating member for insulating the cold junction temperature measuring means from the heat generated inside the temperature regulating unit, and (3) compensating means for compensating the temperature measured by the temperature sensor with the temperatures measured by the cold junction temperature measuring means.

BRIEF DESCRIPTION OF THE DRAWINGS

The above and other objects, advantages and features of this invention will be more fully understood when considered in conjunction with the following figures, in which like numerals designate like or corresponding components and of which.

DETAILED DESCRIPTION OF THE INVENTION

Figure 1:
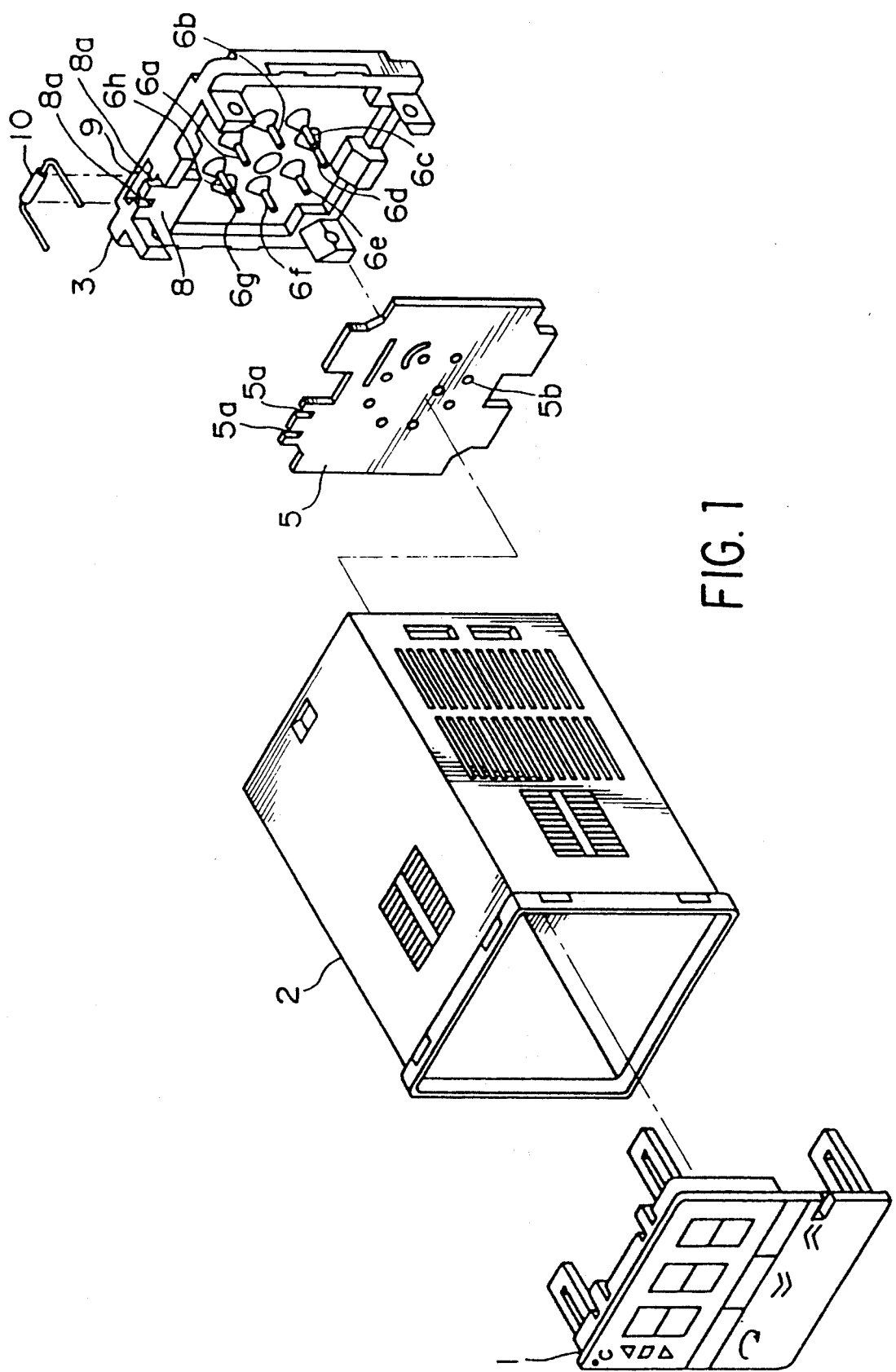
FIG. 1 is a perspective view of a disassembled temperature regulating unit of a temperature regulator according to a preferred embodiment of this invention.
Figure 2:
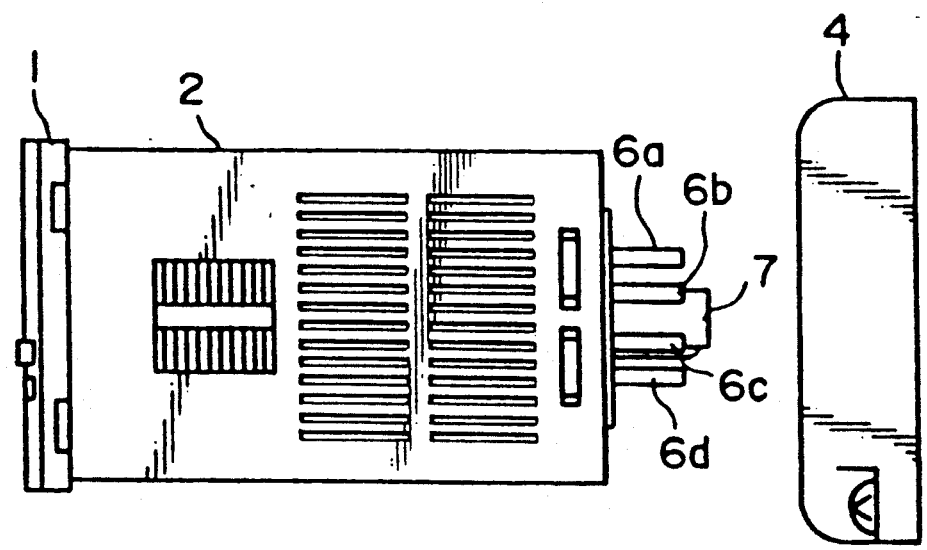
FIG. 2 is a side view of a temperature regulating unit and a socket according to the invention.
Figure 3:
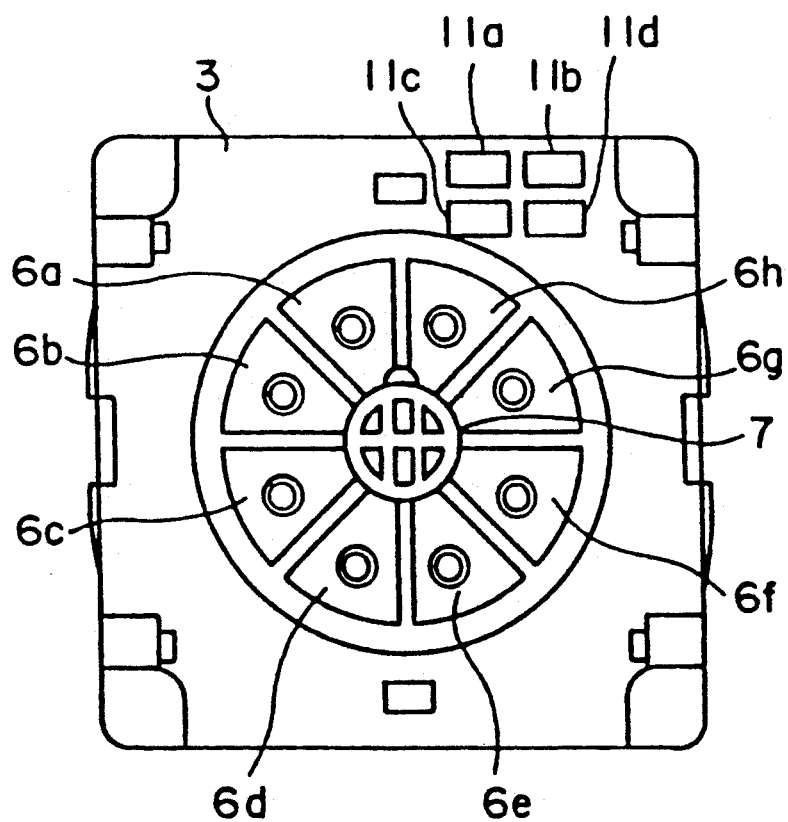
FIG. 3 is a rear view of a terminal base according to the invention.

In FIGS. 1 to 3, a temperature regulating unit according to a preferred embodiment of this invention includes a front case 1 and a rear case 2. A terminal base 3 is provided on the rear side of rear case 2. Terminal base 3 includes eight pin terminals 6a–6h which are oriented, e.g., in circular configuration and are inserted into a printed circuit board 5 and a socket 4 in the orientation as shown in FIG. 2. Pin terminals 6a–6h are insert-molded into base 3. A boss 7 is disposed at the center of base 3. Also, base 3 includes a thermal insulating flat plate 8 having a pair of recesses 8a, and a cut-away portion 9. Either or both surfaces of plate 8 can be corrugated as shown by side surface 8b. Circuit board 5 is disposed near insulating plate 8 in parallel with base 3. Circuit board 5 includes a pair of cut-away portions 5a and eight through-holes 5b. Two terminals of a cold junction temperature measuring device 10, which is a temperature-sensitive resistor made, e.g., of platinum and placed in cut-away portion 9, are mounted on cut-away portions 5a and 8a. Device 10 changes its resistance as a function of temperature. Pin terminals 6a–6h are inserted into throughholes 5b. Thus, device 10 and terminals 6a–6h are connected to circuit patterns (not shown) provided on circuit board 5.

As shown in FIG. 3, four through-holes 11a–11d are disposed on base 3 through which atmospheric air is introduced in cut-away portion 9 in which device 10 is positioned. A thermocouple 22 (described below and which may be positioned remote from the temperature regulating unit) is exposed to the atmosphere and functions as a temperature sensor. Device 10 measures the temperature of the atmospheric air introduced into cut-away portion 9 of base 3 to compensate the temperature measured by thermocouple 22. Terminal base 3 is fixed to the rear end of rear case 2 to complete the temperature regulating unit.

Figure 4:
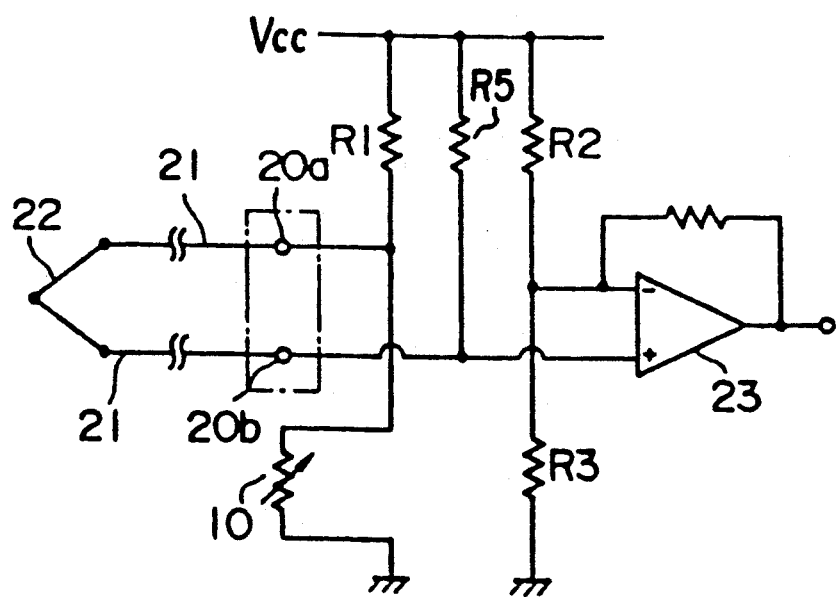
FIG. 4 is an input circuit configuration of the temperature regulating unit including a thermocouple and a cold junction temperature measuring device according to the invention.

In FIG. 4, a thermocouple 22 is shown connected to input terminals 20a and 20b, which are provided as cold junctions, via lines 21. Lines 21 generate a thermoelectromotive force nearly equal to that produced by thermocouple 22, i.e., there may be some resistance losses. Resistors R1–R3 and device 10, which has a resistance which varies as a function of the temperature near terminals 20a and 20b, constitute a bridge circuit. An operational amplifier 23 amplifies the voltage difference between its two input terminals and outputs an electric signal, the level of which corresponds to the temperature measured by thermocouple 22. This output signal is sent to a controller (not shown) to contol a process so that its temperature can reach target values. Resistor R5 maintains a voltage input to amplifier 23 should thermo couple 22 and/or line 21 break.

In this embodiment, device 10 is insulated from the heat generated inside the temperature regulating unit by circuit board 5 and thermal insulating plate 8 forming a double-wall insulating partition. Consequently, device 10 is not adversely affected by this heat and can correctly detect the temperature near the cold junction.

The above description and the accompanying drawings are merely illustrative of the application of the principles of the present invention and are not limiting. Numerous other arrangements which employ the principles of the invention and which fall within its spirit and scope may be readily devised by those skilled in the art. Accordingly, the invention is not limited by the foregoing description, but only limited by the scope of the appended claims.

We claim:

1. A temperature regulator comprising:
   a temperature regulating unit including a housing having a portion enclosing heat generating elements;
   a temperature sensor;
   cold junction temperature measuring means for measuring a temperature of a cold junction;
   compensating means, responsive to an output of said temperature sensor and an output of said cold junction temperature measuring means, for compensating the temperature measured by said temperature sensor with the temperature measured by said cold junction temperature measuring means;
   said cold junction temperature measuring means interconnecting said temperature sensor and said compensating means;
   a double-wall partition for heat shielding said cold junction temperature measuring means from heat generated inside said temperature regulating unit, said double-wall partition comprising:
   a thermal insulating plate disposed adjacent said cold junction temperature measuring means, and a printed circuit board for mounting electronic components, said plate and said printed circuit board being disposed generally in parallel and adjacent one another and between said cold junction temperature sensing means and the portion of said housing enclosing said heat generating elements, said double-wall partition insulating said cold junction temperature measuring means; and
   a terminal base member mounted on said temperature regulating unit and including said thermal insulating plate, said terminal base member including protruding pin terminals for mounting said temperature regulating unit to a socket.

2. The temperature regulator as in claim 1, wherein said terminal base member includes a cut-away portion and said cold junction temperature measuring means is disposed in said cut-away portion.

3. The temperature regulator as in claim 1, wherein said terminal base member includes a through-hole through which atmospheric air is introduced into contact with said cold junction temperature measuring means.

4. The temperature regulator as in claim 1, wherein said thermal insulating plate is a flat plate.

5. The temperature regulator as in claim 1, wherein said thermal insulating plate has a pair of recesses for accommodating a lead of said cold junction temperature measuring means.

6. The temperature regulator of claim 1, wherein said temperature sensor is a thermocouple.

7. The temperature regulator as in claim 1, wherein said cold junction temperature measuring means is a resistor which is made of platinum and has a resistance which varies as a function of temperature.

8. The temperature regulator as in claim 7, wherein two terminals of said resistor extend through said printed circuit board and are connected to circuits on a side of said printed circuit board.

9. The temperature regulator of claim 8, wherein said cold junction temperature measuring means is located on an opposite side of said printed circuit board from a side of said printed circuit board which faces the interior of said housing.

10. A temperature measuring device comprising:
    a case member;
    a temperature sensor;
    cold junction temperature measuring means disposed in said case member for measuring a temperature of a cold junction;
    circuit means disposed in said case member and including a compensating means, responsive to an output of said temperature sensor and an output of said cold junction temperature measuring means, for compensating the temperature measured by said temperature sensor with the temperature measured by said cold junction temperature measuring means;
    a first thermal insulating member disposed adjacent one side of said cold junction temperature measuring means; and
    a second thermal insulating member disposed adjacent said first thermal insulating member, said first and second thermal insulating members being disposed between said cold junction temperature measuring means and said circuit means for double-wall insulating said cold junction temperature measuring means from heat generated by said circuit means.

11. The regulator as in claim 10, wherein said first insulating member comprises a flat plate having a pair of recesses for accommodating the leads of said cold junction temperature measuring means.

* * * * *